J. FOLEY.

WASTE-VALVE AND OVERFLOW.

No. 6,739. Reissued Nov. 16, 1875.

Witnesses

Chas. H. Smith

Geo. D. Pinckney

Inventor

James Foley per Lemuel W. Serrell

Atty.

THE NORRIS PETERS CO., PHOTO-LITHO., WASHINGTON, D. C.

UNITED STATES PATENT OFFICE.

JAMES FOLEY, OF BROOKLYN, NEW YORK, ASSIGNOR OF ONE-HALF INTEREST TO GEORGE C. GUNNING.

IMPROVEMENT IN WASTE-VALVES AND OVERFLOWS.

Specification forming part of Letters Patent No. 153,250, dated July 21, 1874; reissue No. 6,739, dated November 16, 1875; application filed October 1, 1875.

*To all whom it may concern:*

Be it known that I, JAMES FOLEY, of Brooklyn, in the county of Kings and State of New York, have invented an Improvement in Waste-Valves and Overflows for Basins and Baths, of which the following is a specification:

Before my invention valves had been made with a tubular stem, which formed an overflow for the water when the level of the same rises above the upper end of the tubular stem.

In some instances this tube and valve have been introduced in the bath itself, and in other instances in a fixed tube at the side of the bath or basin.

When employed in the fixed tube adjacent to the basin it is difficult to remove the valve and its tubular stem, because the slab of marble or wood usually covers the end of the stationary screw, and there is a hole through the same for a rod that operates the valve and tubular stem.

In consequence of the difficulty of removing the tube and valve for cleaning this waste-valve and overflow are objectionable, and but little used.

My invention relates to an improvement that is made for allowing the valve and overflow to be easily removed. For this purpose the valve and its tubular stem is continued up through the marble or wooden slab or table contiguous to the basin or bath, and provided with a removable cap, through which the stem to the handle passes.

Figure 1:
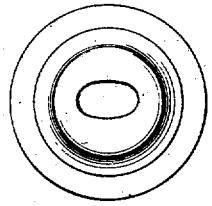
Figure 2:
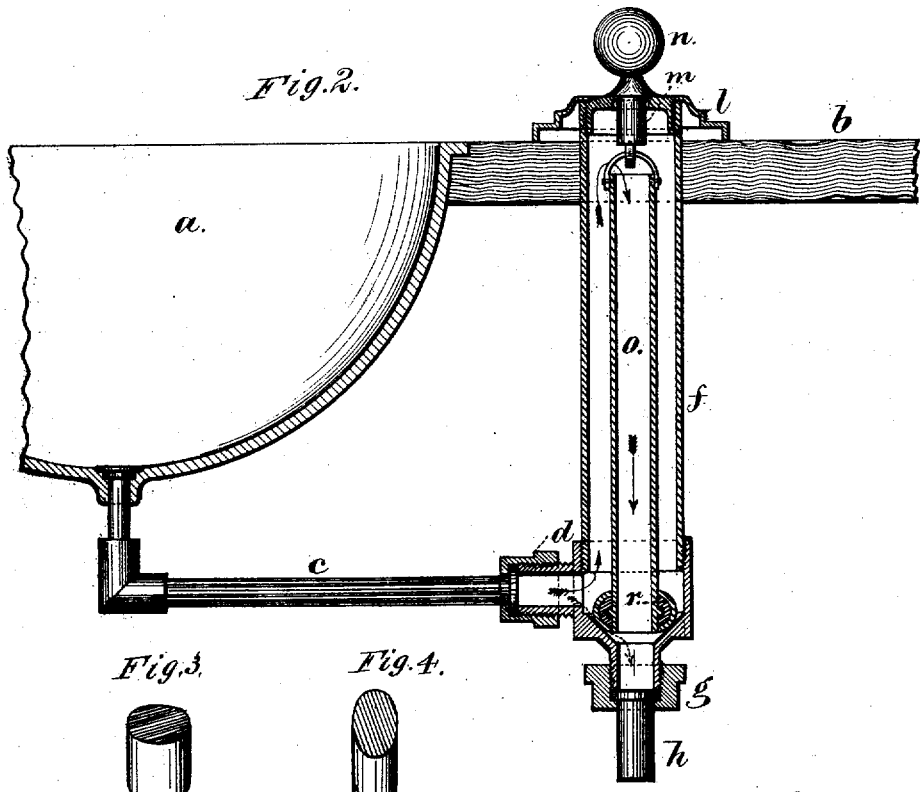
Figure 3:
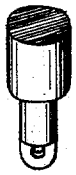
Figure 4:
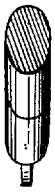

In the drawing this improvement is shown in Fig. 1 by a vertical section of the basin and overflow, and Fig. 2 is a view of the lifting device in the removable cap.

The basin or bath *a* is set in any usual manner, and *b* is the slab or table surrounding or at the side of the same. The waste-pipe *c* leads to the coupling *d* at the lower part of the standing tube *f*, and *g* is a second coupling at the lower end that connects the parts to the waste or sewer pipe *h*. This standing tube *f* passes through the slab or table *b*, and is provided with a removable cap, *l*, preferably screwed upon the tube *f*, and through this cap *l* is a rod, *m*, with a handle, *n*, at the upper end, and the lower end is connected by a bridge or bail with the tubular stem *o* that is within the tube *f*, and forms the overflow-pipe when the water rises in the basin or bath above the upper end of this tube *o*. The valve *r* at the lower end of this stem *o* rests upon the seat at the bottom of the standing tube *f* between the couplings *g* and *d*, and prevents the water running directly away until the tubular stem *o* and valve *r* are lifted. The rod *m* is made so that when it is raised and partially revolved it will suspend the tubular stem and valve. For this purpose the said rod *m* may be made oval sectionally with a circular neck at a proper place, to allow of said turning motion when the valve has been lifted the proper distance, and thus support said valve.

If any obstruction prevents the valve closing tightly the cap *l* may be removed, the valve and stem drawn up and cleaned, and the seat of the valve wiped or cleaned, if necessary, by any suitable article inserted from the upper end of the said stand-pipe *f*.

The valve *r* is preferably made of a short piece of rubber tube drawn over a ring that is attached around the tube *o* at the lower end. This piece of rubber tube may be removed and turned end for end when one portion is worn.

I claim as my invention—

The stand-pipe *f* of the bath or basin overflow passing through the slab or table *b*, and receiving at its upper end the removable cap *l*, in combination with the overflow-pipe *o*, valve *r*, and means for suspending the valve and overflow-pipe from the cap, substantially as set forth.

Signed by me this 28th day of September, 1875.

JAMES FOLEY.

Witnesses:
GEO. T. PINCKNEY,
CHAS. H. SMITH.